FIG. 1.

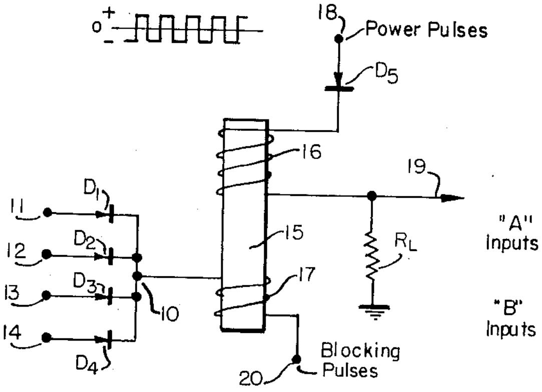

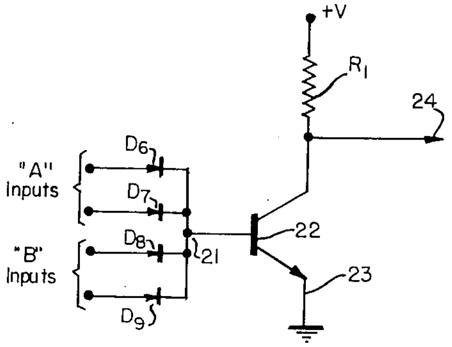

FIG. 2.

| Case | Logical Function | Binary Significance Of Inputs A | Binary Significance Of Inputs B | Binary Significance Of Outputs |
|---|---|---|---|---|
| ① | Any "One" (Buffer Of "1's") | Pulse Represents "1" No-Pulse Represents "0" | Pulse Represents "1" No-Pulse Represents "0" | Pulse Represents "0" No-Pulse Represents "1" |
| ② | "All" Gate | Pulse Represents "0" No-Pulse Represents "1" | Pulse Represents "0" No-Pulse Represents "1" | Pulse Represents "1" No-Pulse Represents "0" |
| ③ | Any A And Neither B ("Not" Gate) | Pulse Represents "0" No-Pulse Represents "1" | Pulse Represents "1" No-Pulse Represents "0" | Pulse Represents "1" No-Pulse Represents "0" |
| ④ | "None" Gate | Pulse Represents "1" No-Pulse Represents "0" | Pulse Represents "1" No-Pulse Represents "0" | Pulse Represents "1" No-Pulse Represents "0" |
| ⑤ | Any "Zero" (Buffer Of "0's") | Pulse Represents "0" No-Pulse Represents "1" | Pulse Represents "0" No-Pulse Represents "1" | Pulse Represents "0" No-Pulse Represents "1" |
| ⑥ | Any B And Neither A (Converse Of 3) | Pulse Represents "0" No-Pulse Represents "1" | Pulse Represents "1" No-Pulse Represents "0" | Pulse Represents "0" No-Pulse Represents "1" |

FIG. 3.

INVENTOR
BRUCE K. SMITH

BY Charles C. English
AGENT

March 21, 1961 B. K. SMITH 2,976,519

LOGICAL CIRCUITS EMPLOYING ALTERNATING NOTATION

Filed May 1, 1956 2 Sheets-Sheet 2

INVENTOR

BRUCE K. SMITH

BY Charles C. English

AGENT 2,976,519
Patented Mar. 21, 1961

2,976,519

LOGICAL CIRCUITS EMPLOYING ALTERNATING NOTATION

Bruce K. Smith, Devon, Pa., assignor to Sperry Rand Corporation, New York, N.Y., a corporation of Delaware Filed May 1, 1956, Ser. No. 581,856

11 Claims. (Cl. 340—174)

The present invention relates to logical circuits of the type employed in computing devices, and is more particularly concerned with improved circuit structures as well as with methods of designing logical circuits which permit substantially any logical function to be performed through the utilization of interconnected like components.

It will be appreciated that computation circuits, as constructed in the past, normally comprise a plurality of dissimilar logical components interconnected in varying arrangements to effect a desired logical function. These dissimilar or specialized logical devices have been of various types, and the most common of these devices have comprised "AND gates," "OR gates," "NOT gates" and bistable flip-flops. From a well established principle of logic, it may be determined that any function can be generated through the use of gates, buffers, and inhibition means, and these only, whereby it follows that a computer can be constructed of these three basic elements. But, the basic elements themselves have in the past taken the form of dissimilar structures whereby relatively complex computer devices have required a large number of differently constructed logical components. This latter consideration has in turn increased the complexity and cost of construction and maintenance of such computers, and has made it impossible to standardize the elemental unit comprising a computer, whereby computers consisting of modular packages have necessitated a number of different basic package constructions.

The present invention serves to obviate the foregoing difficulties and permits the construction of a computer device, as well as of individual logical circuits, through the utilization almost exclusively of interconnected indentical logical components; and in a particular preferred form of the invention, these like logical components take the form of buffer structures and complementing amplifiers, as will be described.

It is accordingly an object of the present invention to provide improved logical circuits.

A further object of the present invention resides in the provision of a method of constructing a modular computer through the use of interconnected like logical components.

Another object of the present invention resides in the provision of a computer device wherein the number of logical components are reduced to a common basic structure.

A further object of the present invention resides in the provision of logical networks comprising interconnected gates and buffers wherein the binary significances of signals assume a varying notation during transfer from one to another portion of the network.

Still another object of the present invention resides in the provision of a method for constructing a logical circuit capable of performing any desired logical function through the utilization of interconnected complementers and buffers.

A further object of the present invention resides in the provision of improved gate-buffer chains wherein gating and buffing functions are accomplished by identical structures, in combination with means for establishing a proper binary notation during transfer of signals from a gating stage to a subsequent buffing stage, and vice versa.

Still another object of the present invention resides in the provision of a method for designing logical circuits capable of performing any desired logical function.

The foregoing objects, advantages, construction and operation of the present invention will become more readily apparent from the following description and accompanying drawings, in which:

Figure 1 illustrates a simplified basic logical component in accordance with the present invention utilizing a complementing pulse type magnetic amplifier.

Fig. 2 illustrates a basic logical component constructed in accordance with the present invention, comprising a complementing transistor amplifier.

Figure 3 is a table of definitions illustrating the varying logical functions which may be performed by the units shown in Figures 1 and 2.

Figure 4:
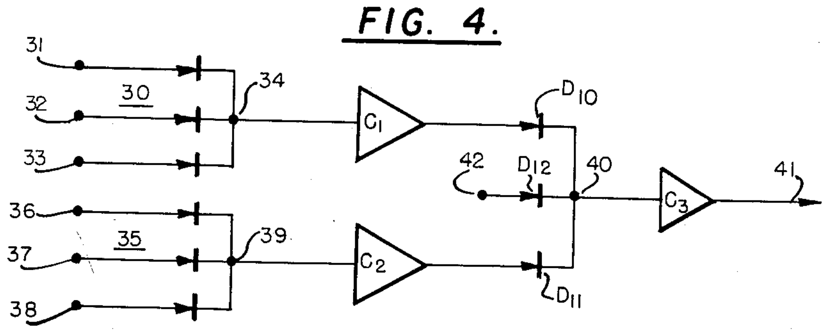
Figure 5A:
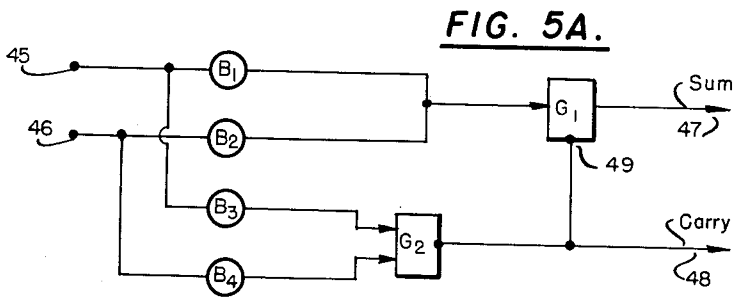
Figure 5B:
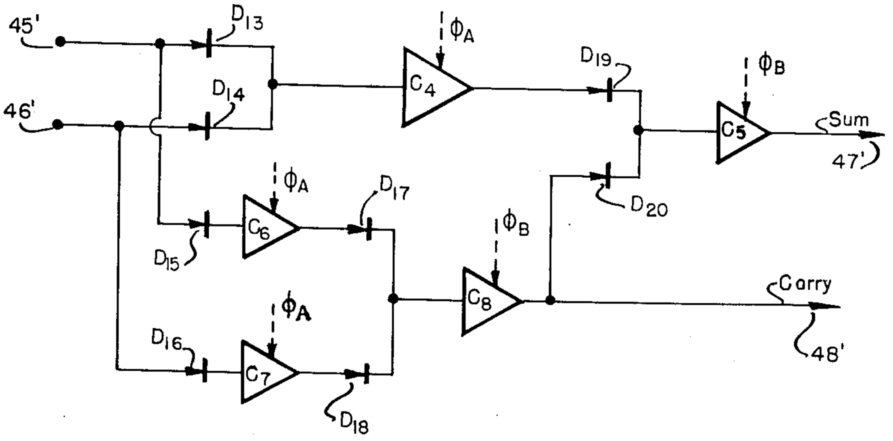

Figure 4 illustrates a gate-buffer chain constructed in accordance with one form of the present invention, and in particular, illustrates an improved AND gate as well as an improved NOT gate, in accordance with the present invention; and Figures 5A and 5B illustrate the method of designing logical circuits in accordance with the present invention; and in particular, Figure 5B depicts an improved half edder constructed in accordance with the present invention.

Before proceeding with a detailed discussion of the present invention, the concepts of alternating notation, upon which the invention is based, will first be discussed. As has been mentioned previously, the three requisites for logical design are the operations of buffing (OR), coincidence (AND), and inhibition (NOT). Independent of the position of amplifiers, a normal gating chain comprises an alternating configuration of OR-AND-OR-AND-etc., with inhibition being a special input characteristic on occasional AND gates. The recognition of a particular gating structure as being an OR, or as being an AND, demands a definition of input signal polarity. A configuration which acts as an AND to positive input signals, i.e., binary "1" being defined as "presence of a pulse," is equally an OR junction for binary "1" defined as "absence of a pulse." Conversely, a positive OR is also a negative AND.

In interconnecting gates and buffers, it should further be recognized that the gate-buffer alternation must be self-consistent; that is to say, the elements must be mutually compatible. Thus, a signal output having a significance of binary "1" from a buffer unit must be the type of signal that is of significance binary "1" at the input of a succeeding gate; and similarly, the output of a gate unit must be acceptable to a succeeding buffer unit. These considerations lead to the following possible conditions:

| Case | Gate | | Buffer | |
|---|---|---|---|---|
| | Input Pulse Significance | Output Pulse Significance | Input Pulse Significance | Output Pulse Significance |
| (1) | 1 | 1 | 1 | 1 |
| (2) | 0 | 0 | 0 | 0 |
| (3) | 1 | 0 | 0 | 1 |
| (4) | 0 | 1 | 1 | 0 |

Examining the above table, it should be noted that gate case (1) is compatible with buffer case (1); gate case (2) is compatible with buffer case (2), etc. In the past, computer structures utilizing gates and buffers interconnected in varying configurations, have made use of cases (1) and (2) only, as identified in the above table; and in particular, a non-alternating notation has been employed whereby presence of absence of a pulse has had the same binary significance at both the input and output of a gate or buffer. This consideration has in turn required that gates and buffers be of substantially different construction to assure a consistent definition of binary significance throughout the gate-buffer chain.

The present invention, however, relies upon a recognition that any structure which effects gating for a given signal definition of binary signals effects buffing for an opposing signal definition of binary significance; and therefore an identical unit may be employed for both gating and buffing, provided means are included for altering the binary significance of signals during transfer from a given gating unit to a next subsequent buffing unit, or vice versa. This latter function, i.e. the alteration of binary significance during transfer from one to a next subsequent logical unit, is accomplished in accordance with the present invention by a complementer; and in this respect a complementer is defined as a unit which produces an output pulse in the absence of an input pulse, or which in the alternative, produces no output pulse in response to presence of an input pulse.

By employing this alternating notation between successive gates and buffers, therefore, any logical circuit may be constructed by interconnection of a plurality of like structural components capable of performing both gating and buffing in dependence upon the input and output signal definitions associated with that component, in combination with complementers adapted to effect a proper binary notation for input and/or output signals from a given unit. In short, any logical function may be effected by appropriate interconnection of similar circuit structures, and this latter consideration permits the construction of modular computers which utilize almost exclusively the same basic logical elements throughout, namely, buffers and complementing amplifiers.

The foregoing considerations will become more readily apparent from the following description. Referring to Figure 1, it will be seen that in accordance with the present invention, a basic logical unit may comprise a plurality of rectifiers or diodes D1 through D4 inclusive, each of which has one electrode thereof coupled to a common point 10. The other electrodes of the said rectifiers D1 through D4 may be coupled to sources of input signals 11 through 14 inclusive. This configuration of rectifiers D1 through D4 may be considered to perform either a buffing or a gating function, depending upon the particular definition of binary significance which is adopted for input and output signal states associated with the unit D1 through D4.

For instance, let us first define a binary "1" as being "the presence of a signal" and a binary "0" as being "the absence of a signal." When this particular definition is in fact adopted, the unit comprising rectifiers D1 through D4 acts as a conventional buffer or OR gate, and all inputs present at any one of the terminals 11 through 14 will pass to common output point 10 without back-circuiting to any of the other inputs. Let us now reverse our definition of binary notation so that a binary "1" is defined as the absence of a pulse while a binary "0" is defined as the presence of a pulse. Utilizing this latter definition, we find that the unit D1 through D4, which previously acted as a buffer for "1's," now acts as a gate (AND) circuit, for "0's." The output junction 10 will not emit a binary "1" (no pulse output) until all input binary "0's" (pulse input at one or more of terminals 11 through 14) have been replaced my binary "1's" (simultaneous pulse absence at terminals 11 through 14).

In short, the basic unit comprising rectifiers D1 through D4 acts as a buffer for signals and as a gate for complements, whereby this same basic unit, comprising a plurality of rectifiers having one electrode coupled to a common output terminal, may be utilized as either a gate or a buffer provided the proper binary definition is established for signals associated with a particular stage.

This establishing of proper binary notation is performed in accordance with the present invention through use of a complementer, and inasmuch as the basic logical component comprising rectifiers D1 through D4 does not have gain, the complementers employed should preferably comprise complementing amplifiers. As had been discussed previously, a complementer comprises a structure which produces an output signal in the absence of an input signal and vice versa; and therefore a complementer may be considered to comprise a true amplifier wherein the binary significance of pulse presence or absence has an alternate notation between the input and output of the said complementer. Thus, if we should define the presence of a signal as a binary "1" at the input of the complementer, and the absence of a signal as a binary "1" at the output of the complementer, the very functioning of the complementer structure causes a binary "1" input thereto to effect an alternate notation binary "1" output therefrom. Similarly, a binary "0" input to the complementer effects a binary "0" output therefrom so long as the alternating pulse notation is adhered to, whereby a complementing amplifier serves directly to reverse the notation of signals between the input and output thereof. It follows therefore that any gate-buffer chain may comprise a plurality of logical units similar to D1 through D4 in Figure 1, interposed by complementing amplifiers, and alternate ones of the said logical unit D1 through D4 will perform gating and buffing functions respectively, due to the reversal in binary notation effected by the interposed complementers.

The complementer devices which may be employed in accordance with the present invention may assume varying constructions including those employing vacuum tubes, and two preferred constructions in accordance with the invention utilize respectively magnetic amplifiers and transistor amplifiers. Again referring to Figure 1, it will be seen that in accordance with the present invention, a complementing magnetic amplifier may comprise a core 15 of magnetic material, preferably but not necessarily exhibiting a substantially rectangular hysteresis loop, and the said core 15 includes a power winding 16 and an output winding 17 thereon. One end of power winding 16 is coupled to a source 18 of alternately positive and negative-going power pulses, via a rectifier D5; and the other end of the said power or output winding 16 may be coupled to an output point 19 whereby outputs selectively appear across load $R_L$. One end of input winding 17 may be coupled to input point 10 comprising the common output point of rectifiers D1 through D4, while the other end of input winding 17 may be coupled to a source 20 of spaced blocking pulses which serve to prevent inputs to the winding 17 at times other than those corresponding to predetermined potential excursions of the power pulse source 18, preferably comprising negative-going excursions of the said source 18.

In operation, let us initially assume that the core 15 is at plus remanence and that each positive-going power pulse from source 18 effects current flow via rectifier D5 and winding 16 whereby core 15 is driven from positive remanence into positive saturation. For this state of operation, there is relatively little flux change in the core 15 whereby winding 16 presents a low impedance to power pulses from source 18; and each such positive-going power pulse will effect a corresponding output pulse at terminal 19. If now an input pulse should be applied to winding 17 from terminal 10 during a selected negative-going excursion of power pulse source 18 (during which time rectifier D5 is cut off), this input pulse to winding 17 will switch core 15 from positive remanence to negative remanence, whereby a next subsequent positive-going power pulse from source 18 will drive the core from negative remanence through the unsaturated portion of its hysteresis loop. For this latter state of operation there is a relatively large flux change in core 15 whereby substantially no output appears at terminal 19. In short, the operation of the magnetic complementing amplifier illustrated in Figure 1 is such that regularly occurring pulse outputs appear at terminal 19 in the absence of an input at terminal 10, while presence of an input pulse at the said terminal 10 inhibits production of a next subsequent output pulse.

It will be appreciated that the magnetic complementer described in reference to Figure 1 is of the series pulse type, and this particular representation is meant to be illustrative only. Other forms of magnetic complementers may be employed, including parallel complementers, wherein the load is connected in parallel with the power winding or is coupled to a separate winding on the core; and in addition, the magnetic complementers may be of the carrier type rather than of the pulse type. Such magnetic complementers, in combination with the logical structure comprising rectifiers D1 through D4, permit the said structure D1 through D4 to perform, for instance, a buffing function for input "1's" with a subsequent reversal of binary notation at the circuit output. Or, in the alternative, the said structure in Figure 1 permits the unit D1 through D4 to perform a gating function for binary "0's," again with a subsequent reversal of binary notation at the output thereof.

Similar functions can be performed through the utilization of transistor complementers, and one such arrangement is illustrated in Figure 2. Again, the logical circuit employed comprises a plurality of rectifiers, this time designated D6 through D9, each of which has one electrode coupled to a common point 21 comprising, in the particular example of Figure 2, the base of an NPN type transistor 22. The other electrodes of rectifiers D6 and D7 are coupled to terminals designated "A" inputs, while the other electrodes of rectifiers D8 and D9 are coupled to further terminals designated "B" inputs; and these differences in input designation will become apparent from a subsequent description of the table comprising Figure 3. The emitter of transistor 22 is grounded at 23, and the collector of the said transistor 22 is coupled both to an output point 24, and to a D.C. source +V via a resistor R1.

It will be appreciated that in the operation of the transistor circuit shown in Figure 2, the NPN type transistor 22 will conduct in response to a positive signal appearing on the base thereof, and will be non-conductive in the absence of such a positive signal at the transistor base. Thus, in the absence of an input signal to the transistor base, output terminal 24 will be substantially at the potential +V. In response to presence of an input signal at the base of transistor 22, the said transistor will conduct, whereby current will be drawn from source +V via resistor R1 and the potential at output terminal 24 will drop to a value appreciably below +V. In short, terminal 24 is at a positive potential of substantially +V in the absence of an input signal, and falls to a potential of substantially ground in response to presence of an input signal, whereby the device again acts as a complementer in accordance with our previous definition.

It will be appreciated that the particular circuit shown in Figure 2 comprises an NPN type transistor in a grounded emitter connection and the grounded emitter connection is in fact preferred inasmuch as the amplifier output impedance is lower than the input whereby a number of like circuits may be driven from a single amplifier element. Other transistor circuits may be employed, however, including those utilizing PNP type transistors and those employing other electrode connections. The operation of all such buffer and transistor complementers circuits again conforms to the previous discussion, however, in that the rectifier network D6 through D9 may perform either a gating or buffing function, depending upon the binary definition of the input signals thereto, with a subsequent reversal in binary notation being effected at the network output through the agency of the complementer employing transistor 22.

One further design consideration should be noted. Inasmuch as transistors of the type illustrated in Figure 2 are steady state devices, no serious timing problems exists between input and output thereof except at very high frequencies where transit time becomes important. When operating at high frequencies, however, it is necessary to assure that amplifier delays through the logical network do not destroy synchronism; and at such high frequencies, therefore, improved control or amplifier delay may be effected by keying the load into the amplifier output at predetermined time periods, thereby to establish fixed input and output time periods for the system.

In passing, it should be noted that pulse type magnetic amplifier devices of the type illustrated in Figure 1, are inherently synchronous in operation whereby timing problems are under good control. As to these magnetic circuits, however, it should further be noted that inputs occur selectively during a given polarity of the power pulse source, while outputs selectively appear during a next subsequent opposite going polarity excursion of the said power pulse source; and therefore plural magnetic amplifier stages, connected in cascade, require opposing phases of energization. This latter consideration may in turn, as will be discussed, necessitate the interposition of delay at various portions of an overall logical network to assure proper timing between input and output pulses for each logical unit, and such delay may be either passive or active in nature. Active delays may in fact be effected by further magnetic amplifiers, for instance of the non-complementing type.

As has been discussed previously, the basic logical unit of the present invention, comprising a plurality of rectifiers having one of their electrodes coupled to a common output point and having signal sources coupled to the other electrodes thereof, in combination with a complementer for establishing reversal in binary notation between input and output of the overall unit, may be considered to act as a conventional buffer (OR) gate, or as a conventional coincidence gate (AND) gate. This basic unit, however, may in fact be considered to perform other logical functions in dependence upon the particular definitions given to pulse presence or absence at the input and output of the device; and attention is invited to Figure 3 which designates in detail the various functions characteristic of the basic circuit shown in Figure 2, in accordance with the definitions adopted for each such function.

Thus, case (1) in Figure 3 corresponds to the situation already discussed wherein the circuit acts as a buffer of "1's." Cases (2) through (6) illustrate other functions which may be performed by the circuits of Figure 1 or 2; and in particular, these other functions comprise coincident gating of "0's"; NOT gates wherein inhibition may be applied to either the "A" input or "B" input depending upon the pulse definition adopted; NONE gates; and buffers of "0's." The actual function which may be performed by the circuit depends, as is clearly shown in the table of Figure 3, upon the pulse definition selected at the various inputs and output of the unit; and plural identical units of the types shown in Figure 1 or 2 may therefore be interconnected through the agency of complementing amplifiers which assure the proper binary notation (as set forth in Figure 3), at the various inputs to the units, whereby any logical function may be performed through the utilization of diodes and complementers only.

One possible interconnection of diodes and complementers in a gate-buffer chain has been illustrated in Figure 4, and this particular representation may in fact be considered to comprise a gate-buffer chain such as may be employed in various logical circuits. In particular, the arrangement comprises a first diode cluster 30 having input points 31 through 33 and a common output point 34, and a second diode cluster 35, having input points 36 through 38 and an output point 39. The said output points 34 and 39 are coupled to the inputs of complementers C1 and C2 and the outputs of the said complementers are in turn coupled to the inputs of a further diode cluster comprising diodes D10 and D11 coupled to common point 40. The said common point 40 is, as illustrated, coupled to the input of a further complementer C3 whereby an ultimate output may be taken at point 41, which output may in fact be coupled to one input of a still further diode cluster, if so desired.

Examining the operation of the overall circuit thus illustrated in Figure 4, let us first assume that our pulse definition is such that presence of a pulse at any one of terminals 31 through 33 and 36 through 38 corresponds to a binary "1." For this assumed definition, the diode clusters 30 and 35 each act as buffers of "1's" and correspond to case (1) of Figure 3. Presence of a pulse at any one or more of terminals 31 through 33 effects a pulse at terminal 34; and similarly, presence of a pulse at any one or more of terminals 36 through 38 effects a further pulse at terminal 39.

The notation of pulses appearing at terminal 34 is reversed by complementer C1; and similarly, the notation of pulses appearing at terminal 39 is reversed by interposed complementer C2 whereby presence of a pulse at either of terminals 34 or 39 effects absence of a pulse at the anodes of rectifiers D10 and/or D11. Thus, as has been discussed previously, the binary notation in the system has been reversed, and absence of a pulse at the anodes of rectifiers D10 and/or D11 is now defined as binary "1" whereby the diode cluster comprising rectifiers D10 and D11 acts as a coincidence gate in accordance with case (2) of Figure 3. The signal state at terminal 40 is in turn reversed by interposed complementer C3 whereby reversed notation pulses appearing at terminal 41 may again be coupled to a further diode cluster acting as a buffer of "1's."

In short, clusters 30 and 35 perform the logical function of buffing, while the further cluster comprising diodes D10 and D11 performs the logical function of gating, notwithstanding that these several clusters are identical in structure; and this reversal in function has been accomplished through the alternating notation effected by the several complementers employed.

In its narrower aspects, it should be noted that the arrangement comprising complementers C1, C2 and C3, in combination with rectifiers D10 and D11, acts as a gate having the same input and output binary significances as do the diode clusters 30 and 35. Thus, presence of a pulse, defined as binary "1," appearing at one or the other of terminals 34 and 39, will be accompanied by absence of a pulse, defined as binary "0," at terminal 41, inasmuch as one or the other of complementers C1 or C2 will provide inhibition to complementer C3 for this single input pulse state. Simultaneous presence of input pulses, defined as binary "1," at both of terminals 34 and 39 will in turn be accompanied by presence of a further output pulse, defined as binary "1," at terminal 41, inasmuch as both complementers C1 and C2 will be inhibited whereby no inhibition is applied to complementer C3. Conventional gate-buffer chains therefore may be more completely standardized through the substitution of the network comprising complementers C1, C2 and C3 with their interposed diodes, for other types of coincidence gates utilized heretofore.

In the particular example illustrated in Figure 4, it should be noted that a further diode D12 is coupled between input point 42 and the common junction 40; and the addition of this further diode D12 permits the gating circuit described to perform a NOT function. In the absence of a pulse input at terminal 42, the overall circuit will operate as before. However, application of a positive pulse at terminal 42 will provide an input to complementer C3 whereby no output pulse appears at terminal 41, regardless of the pulse states at the cathodes of diodes D10 and D11. Thus, this further input, comprising rectifier D12, acts to inhibit any possible output from the overall system. It should further be noted that input pulses coupled to terminal 40 via diode D12 have an opposite binary significance from pulses coupled to the said terminal 40 via rectifiers D10 and D11; and this reversal in notation is accomplished by reason of the fact that, while complementers are interposed between pulse input terminals 34 and 39 and the anodes of diodes D10 and D11, no complementer is interposed between pulse input terminal 42 and the anode of diode D12. Negation, therefore, may be effected in accordance with the present invention by utilizing real signals for inhibition purposes in combination with complement signals for control purposes, or vice versa, and this concept is illustrated in cases (3) and (6) of Figure 3.

It will be appreciated from the foregoing discussion, as well as from the definitions set forth in table 3, that any logical function may be performed by interconnecting OR circuits, AND circuits and NOT circuits; and arrangements performing these several functions in accordance with the invention have now been described. Any conventional logical circuit, comprising different types of logical components may therefore be reduced to a basic logical circuit comprising interconnected diode clusters and complementers; and this particular consideration permits for more ready packaging of components in the construction of modular computers having a standard form of logical element.

By way of example, Figures 5A and 5B illustrate the application of the invention in the construction of an improved half adder utilizing the standard components of the present invention. Thus, referring to Figure 5A it will be seen that a conventional half adder may comprise buffers B1 through B4 coupled as shown to input terminals 45 and 46. The output of buffers B1 and B2 is coupled to one input of an inhibition type gate G1, and the output of the said gate comprise a "sum" terminal 47. The outputs of buffers B3 and B4 are coupled to separate inputs of a coincidence gate G2, and the output of the said gate G2 comprises a "carry" terminal 48 and is also coupled to an "inhibition" terminal 49 of the gate G1.

Ordinarily, gates G1 and G2 differ in construction from one another, and further differ in construction from buffers B1 through B4. In operation, presence of a pulse at one or the other but not both of terminals 45 and 46 will effect an output pulse at sum terminal 47, inasmuch as gate G2 provides no output, whereby gate G1 is uninhibited. For this situation, therefore, wherein a pulse is present at one or the other of terminals 45 and 46, but not at both, a sum of "1" and a carry of "0" is provided. Simultaneous application of pulses at terminals 45 and 46 effects an output pulse from gate G2 whereby gate G1 is inhibited, and this simultaneity of inputs therefore produces a sum output of "0" and a carry output of "1." Simultaneous absence of pulses at terminals 45 and 46 will, of course, result in no output pulse from either of gate G1 or gate G2, whereby a sum of "0" and a carry of "0" is effected.

This same half addition function may be accomplished, in accordance with the present invention, through the principles of alternating notation, by employing basic logical components comprising diodes and complementers. Thus, referring to Figure 5B, it will be seen that input terminals 45′ and 46′ may be coupled respectively to diodes D13, D14, D15 and D16, and these diodes D13 through D16 correspond to buffers B1 through B4 in Figure 5A. Gate G2 is replaced by an arrangement comprising complementers C6, C7 and C8 interposed by diodes D17 and D18; and it will be appreciated that this latter configuration conforms to the coincidence gating arrangement already discussed in reference to Figure 4.

A further gating arrangement is provided for gate G1 (Figure 5A), and this further gating arrangement comprises diodes D19 and D20. Inasmuch as diode cluster D13—D14 has been assumed to act as a buffer, complementer C4 is interposed between the output of this diode cluster and the gate input comprising the anode of D19, to effect the required reversal in binary notation so that diode D19 can now perform a gating function. Inasmuch, however, as the output of gate G2 (Figure 5A) is to perform an inhibition function on gate G1 (Figure 5A), the output complementer C8 (which corresponds to the equivalent output of gate G2 in Figure 5A), is coupled directly to the anode of diode D20 without interposition of a further complementer; and therefore pulses appearing at the anodes of diodes D19 and D20 have opposite binary significances to one another whereby one of the said pulses performs an enabling function while the other of the said pulses performs an inhibition function. Complementer C5 acts once more to reverse the binary notation at the output of the inhibition type gate comprising D19 and D20 whereby the proper notation may appear at the sum terminal 47′. It will be appreciated that by elimination of complementer C5 (and for that matter by elimination of complementer C3 in Figure 4), a complement output may be directly achieved.

The operation of the circuit shown in Figure 5B will, upon examination, be seen to correspond to that already described in reference to Figure 5A. Thus, the presence of a pulse, defined as binary "1," at one or the other but not both of terminals 45′ and 46′ will effect inhibition of complementer C4 and will effect further inhibition of one only of complementers C6 and C7 whereby complementer C8 will be inhibited. For this state of operation therefore there will be no pulse at carry terminal 48′ (carry of "0"); and in addition, complementer C5 will be uninhibited whereby a pulse will appear at sum terminal 47′ (sum of "1"). Simultaneous application of input pulses at terminals 45′ and 46′ will effect inhibition of complementers C4, C6 and C7, whereby complementer C8 will produce an output pulse. This output pulse which appears at carry terminal 48′ corresponds to the required carry of "1." The output of complementer C8 is also coupled via diode D20 to the input of complementer C5 inhibiting the said complementer C5 whereby no pulse appears at sum terminal 47′ corresponding to a sum output of "0." Simultaneous absence of pulses at both of terminals 45′ and 46′ permits complementers C4, C6 and C7 to all produce output pulses whereby complementers C5 and C8 will both be inhibited thereby producing a sum of "0" and a carry of "0."

An examination of Figure 5B therefore confirms that the logical function of half addition may be performed through the interconnection of complementers and diodes in place of the unlike structural units utilized in the past. It must again be emphasized that the example of Figure 5B is meant to be illustrative only and generically illustrates the construction of logical units capable of performing any desired logical function through the utilization of standardized components.

As has been discussed, the complementers employed in the present invention may comprise vacuum tubes, magnetic amplifiers, transistors, etc., and may further comprise either steady state or pulse type devices. The half adder arrangement already described in reference to Figure 5B may directly take the form illustrated when steady state devices such as transistors or vacuum tubes are employed. When pulse type structures such as magnetic amplifiers are employed, however, some consideration must be given to timing problems. Thus, if the several complementers C4 through C8 take the form of pulse type magnetic amplifiers, the complementers C4, C6 and C7 may, for instance, be energized by phase A power pulses, while complementers C5 and C8 may be energized by phase B power pulses, as indicated in dotted line in Figure 5B. In this respect, phase A and phase B power pulses both comprise alternating energization waveforms exhibiting positive and negative-going excursions with the positive-going excursions of one phase occurring in coincidence with negative-going excursions of the other phase, and vice versa.

Timing considerations would, in such an instance, be proper for transfer of signals from complementer C4 via diode D19 to the input of complementer C5; and these timing considerations would, similarly, be proper for transfer of pulses from the output of complementers C6 and C7 to the input of complementer C8. For this assumed pulse type magnetic amplifier construction, however, it will be noted that both complementers C8 and C5 are energized by phase B power pulses; and therefore delay means should be interposed, for instance in series with diode D20, between the output of complementer C8 and the input of complementer C5, to effect proper timing between these complementers. These delay means may be either active or passive in nature and, as has already been discussed, one permissible form of active delay may comprise a non-complementing pulse type magnetic amplifier energized by phase A pulses in the particular assumed example of Figure 5B.

While I have described preferred logical embodiments of the present invention, still other arrangements will be suggested to those skilled in the art; and in particular, the principles of alternating notation comprising the present invention may be utilized in the design of circuits adapted to perform any desired logical function. The foregoing discussion is therefore meant to be illustrative only, and should not be considered limitative of the present invention; and all such variations and modifications as are in accord with the principles described, are meant to fall within the scope of the appended claims.

Having thus described my invention, I claim:

1. In an information handling system using binary signals, and in which a plurality of stages are cascaded to perform certain logic operations, the combination of a plurality of at least three such stages, each of said stages including means for combining a plurality of said signals and a complementer for changing each form of said binary signals to the other of said binary signal forms, said complementer including a magnetic core having a rectangular hysteresis characteristic, an input winding, an output winding, and means for applying periodic power pulses to said output winding, each of said stages being substantially the same in signal response, and means for coupling said stages so that the output of a plurality of first ones of said stages is connected to the input of a second one of said stages, the output of said combining means of each stage being connected to the input winding of said complementer in a similar manner in said stages, means for applying input signals to one of said first stages and the complements thereof another of said first stages, whereby said cascaded stages alternate in logic function, and the binary representation of the output signal of said second stage is logically related to the binary representations of the inputs to said one first stage in accordance with the logic relation of either one or the other but not both.

2. In an information handling system using binary signals, and in which a plurality of stages are cascaded to perform certain logic operations of a half-adder, the combination of a plurality of at least three such stages, each of said stages including means for combining a plurality of said signals and a complementer for changing signals representative of one binary digit to signals representative of the other of said binary digits, each of said stages being substantially the same in electrical arrangement, and means for coupling said stages so that the inputs of a first one of said stages are connected to the outputs of a second and a third of said stages, the output of one of said combining means and complementer of each stage being connected to the input of the other in a similar manner in said stages, means for applying binary input signals to be added to the inputs of said second stage and the complements thereof to the inputs of said third stage, whereby said cascaded stages alternate in logic operation with respect to binary representations of said binary input signals, means for deriving a sum signal from the output of said first stage, and means for deriving a carry signal from the output of said third stage.

3. In an information handling system using binary signals, and in which a plurality of stages are cascaded to perform certain logic operations of a half-adder, the combination of a plurality of at least three such stages, each of said stages including means for combining a plurality of said signals and a complementer for changing each form of said binary signals to the other of said binary signal forms, each of said stages being substantially the same in signal response and electrical arrangement, and means for coupling said stages so that the output of a plurality of first ones of said stages is connected to the input of a second one of said stages, the output of one of said combining means and complementer of each stage being connected to the input of the other in a similar manner in said stages, means for applying input signals to one of said first stages, and additional complementers for applying the complements of said input signals to another of said first stages, whereby said cascaded stages alternate in logic function, and the binary representation of the output signal of said second stage is the sum of the binary representations of the inputs to said one first stage, and the binary representation of the output signal of said another first stage is the carry of the binary representations of the inputs to said one first stage.

4. In an information handling system using binary signals, and in which a plurality of stages are cascaded to perform certain logic operations of a half-adder, the combination of a plurality of at least three of said stages, each of said stages including a plurality of diode means having like first electrodes connected together for combining a plurality of said signals, and a complementer having its input connected to said first electrodes for changing each form of said binary signals to the other of said binary signal forms, each of said stages being substantially the same in signal response and electrical arrangement, and means for coupling said stages so that the output of the complementer of each of a plurality of first ones of said stages is connected to the second electrode of a different one of said diode means of a second one of said stages, additional complementers having outputs respectively connected to the second electrodes of said diode means to one of said first stages, additional separate diode means having like first electrodes respectively connected to the inputs of said additional complementers, means for applying input signals to be added to said second electrodes of the other of said first stages, whereby said cascaded stages alternate in logic function, and the binary representation of the output signal of said second stage is the sum of the binary representations of the inputs to said other first stage.

5. The combination as recited in claim 4 wherein said complementers are transistor amplifiers.

6. The combination as recited in claim 5 wherein said transistor amplifiers are connected in the common emitter mode.

7. The combination as recited in claim 4 wherein said complementers are magnetic amplifiers.

8. The combination as recited in claim 7 wherein said magnetic amplifiers are series amplifiers operating at different phases.

9. The combination as recited in claim 7 wherein said magnetic amplifiers are series amplifiers operating at one of two opposite phases, and said means coupling said stages includes delay magnetic amplifiers of a non-complementing type connected between certain ones of said stages so that successive complementers alternate in phase.

10. In an information handling system using binary signals, and in which a plurality of stages are cascaded to perform certain logic operations of a half-adder, the combination of a plurality of at least three such stages, each of said stages including a plurality of diode means having like first electrodes connected together for combining a plurality of said signals, and a complementer having its input connected to said first electrodes for changing each form of said binary signals to the other of said binary signal forms, each of said stages being substantially the same in diode configuration and electrical arrangement, and means for coupling said stages so that the output of the complementer of each of a plurality of first ones of said stages is connected to the second electrode of a different one of said diode means of a second one of said stages, means for applying input signals and the complements thereof to said diode means first electrodes of said first stages, whereby the binary representation of the complementer output signal of said second stage is the sum of the binary representations of said input signals.

11. In an information handling system using binary signals, and in which a plurality of stages are cascaded to perform certain logic operations of a half-adder, the combination of said stages including means for combining a plurality of said signals and a magnetic complementer for changing each form of said binary signals to the other of said binary signal forms, each of said stages being substantially the same in signal response and electrical arrangement and operates at one or the other of two opposite phases, and means for coupling said stages so that the output of a plurality of first ones of said stages is connected to the input of a second one of said stages, said coupling means including magnetic relay means of a non-complementing type and operating at one of said phases, said delay means being connected between certain ones of said stages so that successive complementers alternate in phase, the output of one of said combining means and complementer of each stage being connected to the input of the other in a similar manner in said stages, means for applying input signals to one of said first stages, and additional complementers for applying the complements of said input signals to another of said first stages, whereby said cascade stages alternate in logic function, and the binary representation of the output signal of said second stages is the sum of the binary representations of the inputs to said one first stage.

References Cited in the file of this patent

UNITED STATES PATENTS

| | | |
|---|---|---|
| 2,709,798 | Steagall | May 31, 1955 |
| 2,729,755 | Steagall | Jan. 3, 1956 |
| 2,741,758 | Cray | Apr. 10, 1956 |
| 2,742,632 | Whitely | Apr. 17, 1956 |
| 2,806,152 | Eckert | Sept. 10, 1957 |
| 2,806,648 | Rutledge | Sept. 17, 1957 |
| 2,914,753 | Goodell | Nov. 24, 1959 |

OTHER REFERENCES

"Binary Circuits For Digital Data—Processing Systems" (Miehle), IRE Conventional Record, 1955, Part 4, pages 70 through 83 (page 83 relied on).

UNITED STATES PATENT OFFICE

CERTIFICATION OF CORRECTION

Patent No. 2,976,519 March 21, 1961

Bruce K. Smith

It is hereby certified that error appears in the above numbered patent requiring correction and that the said Letters Patent should read as corrected below.

Column 2, line 29, for "edder" read -- adder --; lines 51 and 52, for "siginficance" read -- significance --; column 3, line 3, for "of" read -- or --; line 71, for "my" read -- by --; column 5, lines 73 and 74, for "complementers" read -- complementer --; column 6, line 8, for "exists" read -- exist --; line 14, for "or" read -- of --; column 12, line 41, for "relay" read -- delay --.

Signed and sealed this 22nd day of August 1961.

(SEAL)
Attest:

ERNEST W. SWIDER
Attesting Officer

DAVID L. LADD
Commissioner of Patents